United States Patent
Bodnar et al.

(12)
(10) Patent No.: US 6,286,228 B1
(45) Date of Patent: Sep. 11, 2001

(54) AIR BLOWER DRYING SYSTEM

(75) Inventors: Paul Bodnar; Rodger Gleason, both of Morris County; Richard J. Macor, Hunterdon County, all of NJ (US)

(73) Assignee: Quick Air, Inc., Chester, NJ (US)

( * ) Notice: Subject to any disclaimer, the term of this patent is extended or adjusted under 35 U.S.C. 154(b) by 0 days.

(21) Appl. No.: 09/707,424

(22) Filed: Nov. 7, 2000

Related U.S. Application Data

(63) Continuation-in-part of application No. 09/456,065, filed on Dec. 6, 1999, which is a continuation-in-part of application No. 09/354,431, filed on Jul. 16, 1999.

(51) Int. Cl.$^7$ .................................................. F26B 19/00
(52) U.S. Cl. ............................... 34/61; 34/666; 34/90; 134/123
(58) Field of Search ........................ 34/61, 229, 666, 34/90; 15/409, 302, 316.1; 134/123; 239/288; 392/384

(56) References Cited

U.S. PATENT DOCUMENTS

| Re. 33,334 | * | 9/1990 | Nelson | 15/302 |
|---|---|---|---|---|
| 3,826,269 | * | 7/1974 | Garrison | 134/123 |
| 3,987,514 | * | 10/1976 | Cooper | 15/409 |
| 4,683,668 | * | 8/1987 | Hondzinski et al. | 34/229 |
| 4,991,316 | * | 2/1991 | Crotts | 34/666 |
| 5,251,281 | * | 10/1993 | Fravel, Jr. | 392/384 |
| 5,407,135 | * | 4/1995 | Jeffs | 239/288 |
| 6,000,095 | * | 12/1999 | Johnson | 15/316.1 |
| 6,021,584 | * | 2/2000 | Schwartz | 34/666 |
| 6,195,907 | * | 3/2001 | Bodnar et al. | 34/90 |
| 6,199,293 | * | 3/2001 | Bodnar et al. | 34/61 |

* cited by examiner

*Primary Examiner*—Teresa Walberg
*Assistant Examiner*—Leonid M Fastovsky

(57) ABSTRACT

The present invention involves a drying system for removing a wetting agent from surfaces of a vehicle. The drying system comprises an application of a surfactant to the surfaces of the vehicle to provide a reduction in the coefficient of friction between the surfaces of the vehicle and the wetting agent The surfactant can be applied to the surfaces of the vehicle prior to, and/or during the wetting of the vehicle. The present invention also involves an air blower device for the removal of the wetting agent from the surfaces of the vehicle which when used in combination with the surfactant provides an enhanced drying effect. The air blower comprises a housing formed for use proximate ground level with an inlet and an outlet, and a motor therein having a shaft with blade means attached thereto for producing an air flow. The blower housing is further formed so that the air blower does not draw in debris proximate ground level. The blower device also comprises a hose which is attached thereto and has a sufficient inner diameter to substantially maintain the produced airflow. Some preferred embodiments of the present invention may include a centrifugal type air blower device (as defined herein) and/or a motorized washing device.

24 Claims, 3 Drawing Sheets

AIR BLOWER DRYING SYSTEM

REFERENCES TO RELATED APPLICATIONS

This application is a continuation-in-part of U.S. patent application Ser. No. 09/456,065 filed on Dec. 6, 1999, by the inventors herein, entitled MOTORIZED WASHING AND DRYING APPARATUS, which is a continuation-in-part of copending patent application Ser. No. 09/354,431 filed on Jul. 16, 1999, by the inventors herein, entitled AIR BLOWER APPARATUS.

FIELD OF THE INVENTION

The present invention relates to a drying system which comprises the use of a small or medium size air blower having a housing, a motor, and blade means for producing and directing an air flow. The blower device is used in combination with a surfactant applied to the surfaces of a vehicle to reduce the coefficient of friction between the surfaces of the vehicle and a wetting agent. The surfactant enhances the effects of the blower and subsequent drying process. Vehicles contemplated include automobiles, sport utility vehicles, all terrain vehicles and motorcycles to name a few.

BACKGROUND OF THE INVENTION

There are various types of air blower devices and apparatuses available which are used or can be used to accelerate drying processes including for example, the drying of a washed and wetted automobile. Generally, all air blower devices have a housing on which a motor is mounted, of which a propeller or blade means is attached, to create and direct an air flow through the housing. Generally, the housings serve two basic purposes which are to provide for the attachment of a motor, and, to provide an enclosed airway for the air flow produced by the motor. The housings can be very simple like a short tube or elaborate like a molded scroll type housing. The motors are usually mounted within the housing and can be small like the motors used in a hair dryer or large like the internal combustion engines used in commercial size leaf blowers. Accordingly, the motors can be powered by electricity or some form of fuel. In virtually all instances the motor of an air blowing device will have a shaft, on which a propeller or "blade means" (any form of propeller or air blade) is attached to produce an air flow through the housing of the device. Generally, if the motor and blade means produce an air flow which is parallel to the motor shaft, it is considered an axial type fan or air blower device, and, if the motor and blade means produce an air flow which is generally perpendicular to the motor shaft, it is considered a centrifugal type air blower device.

When contemplating the drying of a washed and/or wetted vehicle, for example an automobile or motorcycle, the axial or fan type devices usually do not produce sufficient air speed to fully affect the drying process. Alternatively, centrifugal type air blowers tend to more fully affect the drying process by moving large volumes of air at high speeds, however, they do not perform well on all vehicles. This is because the coefficient of friction between the wetting agent and the surfaces of a vehicle can be relatively high preventing an effective removal of the wetting agent with any type air blowing device. In addition, centrifugal type air blowers are generally too cumbersome and heavy for extended use and manipulation by hand and they are, by design, very noisy and can be harmful or at least objectionable if operated by hand, close to a user's ears.

SUMMARY OF THE INVENTION

The present invention involves a drying system for removing a wetting agent from surfaces of a vehicle. The drying system comprises an application of a surfactant to the surfaces of the vehicle to provide a reduction in the coefficient of friction between the surfaces of the vehicle and the wetting agent. The surfactant can be applied to the surfaces of the vehicle prior to, and/or during the wetting of the vehicle. The present invention also involves an air blower device for the removal of the wetting agent from the surfaces of the vehicle which when used in combination with the previously applied surfactant can provide an enhanced drying effect The air blower comprises a housing formed for use proximate ground level with an inlet and an outlet, and a motor therein having a shaft with blade means attached thereto for producing an air flow. The air blower housing is further formed so that the air blower does not draw in debris proximate ground level. The air blower device also comprises a hose which is attached thereto and has a sufficient inner diameter to substantially maintain the produced airflow. Some preferred embodiments of the present invention may include a centrifugal type air blower (as defined herein) and/or a motorized washing device.

Accordingly, it is an important objective of the present invention described herein to provide for an independent, relatively small, mobile drying system which is effective at removing a wetting agent from a washed and/or wetted vehicle, for example an automobile or motorcycle.

It is another important objective of the present invention described herein that it may include a motorized washing device so that the system can both wet and dry a vehicle.

It is another important objective of the present invention that it be operable by a user over extended periods without fatigue or hearing discomfort.

It is another important objective of the present invention that the present invention be operable using a single energy source, with one embodiment applicable for use where an electrical source is present, and another embodiment applicable for use where there is no electrical source.

It is yet another objective of the present invention that it be commercially viable, simple in design and cost-efficient to manufacture.

DETAILED DESCRIPTION OF THE DRAWINGS

Figure 1:
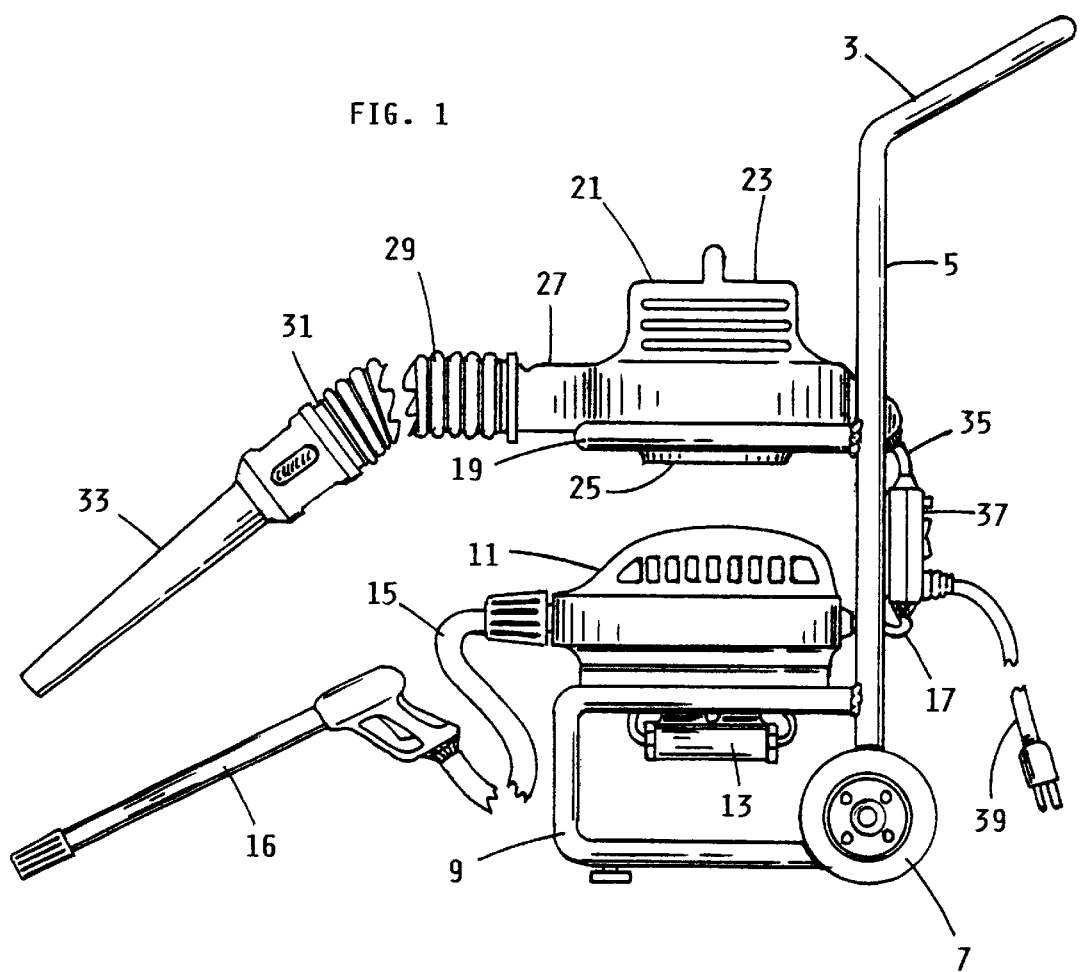
FIG. 1 shows a right side elevation view of an embodiment of the present invention, a drying system including an air blower device and a washing device for both wetting and drying a vehicle, for example an automobile or motorcycle; and, FIG. 2 shows a right side elevation, cross-section view of the air blower device shown in FIG. 1; and, FIG. 3 shows a right side elevation, cross section view of a prior art axial type air blowing device.

FIG. 1 shows a right side elevation view of a present invention drying system 3, including a motorized drying device 21 and a motorized washing device 11 so that the system can wash, wet and dry a vehicle, for example an automobile or motorcycle. There is a cart or base 5 having means for mobility being two wheels, one of which can be seen from this view as wheel 7. Embodiments of the present invention may have a base or cart which is mobile, and therefore, can be pushed or pulled by a user to easily move the motorized washing and drying apparatus around. Base 5 is further formed with brackets 9 and 19 for the attachment of motorized washing device 11 and motorized drying device or air blower 21 respectively. Obviously there could be many ways by which these devices could be attached, and therefore, brackets 9 and 19 are merely an example of many possible attachment methods. Motorized washing device 11 has a motor therein not seen in this view, which can develop a pressurized discharge of a wetting agent (anything that can wash, rinse, and/or wet something) such as water, or cleaning solutions or any combination thereof. A surfactant could easily be added to a wetting agent for washing, and/or rinsing a vehicle to reduce the coefficient of friction between the surfaces of the vehicle and the wetting agent. Motorized washing device 11 also has a valve body 13, a discharge hose 15 (shown here in a partial, cut view) and a discharge nozzle 16. The length of discharge hose 15 may be any practical length which provides a user with the ability to easily pressure-wash something, for example an automobile.

Motorized drying device or air blower 21 has housing 23 with a motor inside (not seen in this view) for developing a high volume, high speed airflow. Motorized drying device 21 is a centrifugal type air blower (as defined herein). As specified earlier herein, when contemplating the acceleration of drying processes, for example, drying a washed and wetted automobile, the axial or fan type air blowing devices usually do not produce sufficient air speed to fully affect the drying process Through extensive research and testing, applicants have determined that a centrifugal type air blower tends to more fully affect the drying process by producing large volumes of air at high speeds, however, it does not perform well on all vehicles. This is because the coefficient of friction between the wetting agent and the surfaces of a vehicle can be relatively high preventing an effective removal of the wetting agent with any type of air blower. It is, therefore, important that the coefficient of friction between the wetting agent and the surfaces of a vehicle are kept to a minimum to optimize the effect of the air blower and drying process. Accordingly, a surfactant applied to the surfaces of the vehicle prior to or during the wetting process, can greatly enhance the effects of a centrifugal blower and the subsequent drying process. The high speed airflow tends to physically displace the wetting agent off of the vehicle while the high volume airflow tends to effectively evaporate and atomize the remaining liquid droplets. When a vehicle is treated with a surfactant, a centrifugal air blower can quickly and efficiently remove the wetting agent without leaving any water spots on the surface of the vehicle.

Although the present invention does not require a centrifugal type air blower, preferred embodiments of the present invention include a centrifugal air blower (as defined herein) because the air blower has the performance and features best suited for the application. The housing 23 of motorized drying device 21 also has an inlet 25 and an outlet 27 which is formed for the attachment of a flexible hose 29 (shown in a cut partial view) which has an end 31 formed for the attachment of a nozzle 33 to direct and control the airflow. The length of the hose 29 may be any practical length which provides a user with the ability to easily dry something, for example a washed and wetted automobile. Note that the diameter of hose 29 is relatively wide so that the inner diameter of hose 29 is sufficient to substantially maintain the airflow produced by air blower 21. Present invention 3 shown here also has electrical wiring 17 running from washing device 11 to switch unit 37, and, wiring 35 running from drying device 21 to switch unit 37. Switch unit 37 has wiring or electrical cord 39 (shown in a partial, cut view) which can be connected to an electrical source to provide electrical power to both motorized washing device 11 and motorized drying device or air blower 21. Such an arrangement is both practical and efficient because the present invention only requires one electrical cord which can then supply power to both motorized washing and drying devices independently or simultaneously via a main switch. For example, drying system 3 including both motorized washing and drying devices could be used to both wash and dry vehicles at new and used car dealerships, auto body and service shops, motorcycle shops etc. or where ever there is an electrical source with at least one outlet. Aternatively, there could also be a motorized washing and drying apparatus similar to that shown in this view but with both motors driven by some form of fuel so that the system or apparatus could be used out in the field where there was no electrical source. If the motor of the washing device was an internal combustion type; and, the motor of the drying device was an internal combustion type, this would also be a practical and efficient preferred embodiment of the present invention. This arrangement of having the air blower unit attached to a base formed for use proximate ground level achieves several objectives. The user does not need to handle and manipulate the heavy blower unit 21, only the connected hose 29 and nozzle 33 which are both lightweight and easy to handle over extended periods. In addition, the user's ears are somewhat isolated from the noisy blower unit which rests close to or proximate to the ground, a short, none the less, remote distance away from the user.

Figure 2:
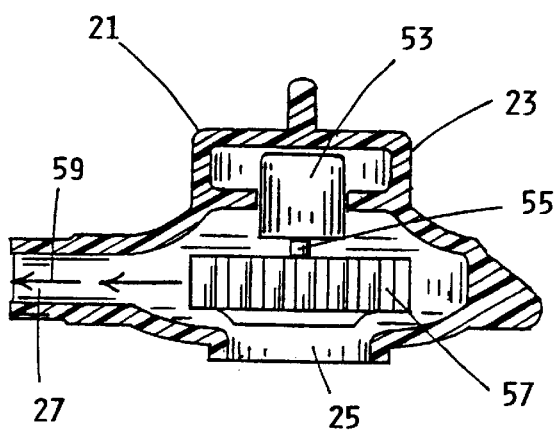

FIG. 2 shows a right side elevation, cross-section view of the centrifugal air blower 21 shown in FIG. 1, wherein air blower 21 has housing 23 with inlet 25 and outlet 27. Positioned and secured within housing 23 is motor 53 which has motor shaft 55. Air blower 21 is positioned the same as in FIG. 1 with the motor shaft 55 perpendicular or about perpendicular to the ground. The present invention does not require that air blower 21 be positioned such that the shaft is substantially perpendicular to ground level, however, preferred embodiments have the air blower unit positioned this way to maximize the working life of any bearings that may be associated with motor 53 or motor shaft 55. Attached to motor shaft 55 is blade means 57 which when spun by motor 53 produces an airflow 59 through housing 23, relative to shaft 55. The air flow 59 produced by blade means 57 is substantially perpendicular to motor shaft 55. Generally, all the motors of fans and air blower devices have a motor shaft, on which a propeller or "blade means" (any form of propeller or air blade) is attached to produce an air flow through the housing of the device. If the motor and blade means produce an air flow which is perpendicular to the motor shaft as shown in FIG. 2, it is considered a centrifugal type air blowing device; and, if the motor and blade means produce an air flow which is parallel to the motor shaft as shown in FIG. 3, it is considered an axial type fan or air blowing device.

Figure 3:
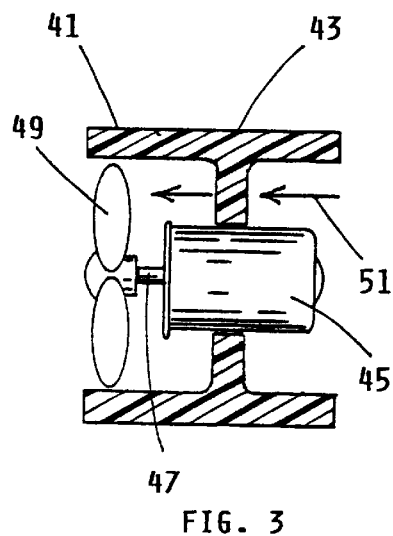

FIG. 3 shows a right side elevation, cross section view of a prior art axial type air blower, wherein there is fan or air blower 41 with housing 43. Housing 43 has motor 45 mounted therein. Motor 45 has motor shaft 47 on which blade means 49 is attached to produce air flow 51 which is substantially parallel to motor shaft 47. In this figure blade means 49 is simply a propeller. As earlier noted, the axial or fan type air blowing devices usually do not produce sufficient air speed to fully affect the drying process, and therefore, they are not preferred for the intended application.

Figure 4:
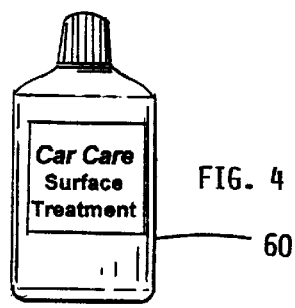
FIG. 4 shows a bottle of surfactant.

FIG. 4 shows a bottle of a surfactant 60. The present invention comprises the use of a surfactant applied to the surfaces of a vehicle to effectively reduce the coefficient of friction between an applied wetting agent and the surfaces of the vehicle. Applicants have determined that when the surfaces of a vehicle are properly treated with a surfactant, a centrifugal type air blower is extremely effective at drying the washed, and/or wetted vehicle. This is because the high speed airflow tends to physically displace the wetting agent off of the vehicle while the high volume airflow tends to effectively evaporate and atomize the remaining liquid droplets. The surfactant may be applied prior to and/or during the application of a wetting agent. For example, certain waxes, polishes and surface treatments applied prior to washing a vehicle can effectively reduce the coefficient of friction between the surfaces of the vehicle and any applied wetting agents, sometimes for many washing and drying events. Another possibility would be apply a surfactant to a vehicle during the wetting process. This could be accomplished by combining the surfactant with a wetting agent used to wash and/or rinse the vehicle. So, therefore, the present invention includes the use of a surfactant applied to the surfaces of a vehicle prior to and/or during the washing and/or rinsing of the vehicle. Under such conditions, the drying device or air blower can effectively and efficiently remove and blow off the wetting agents leaving virtually no residue or spots from the wetting agent Again, the wetting agent can be anything used to wet the vehicle including for example washing solutions or water or any combination thereof.

Figure 5:
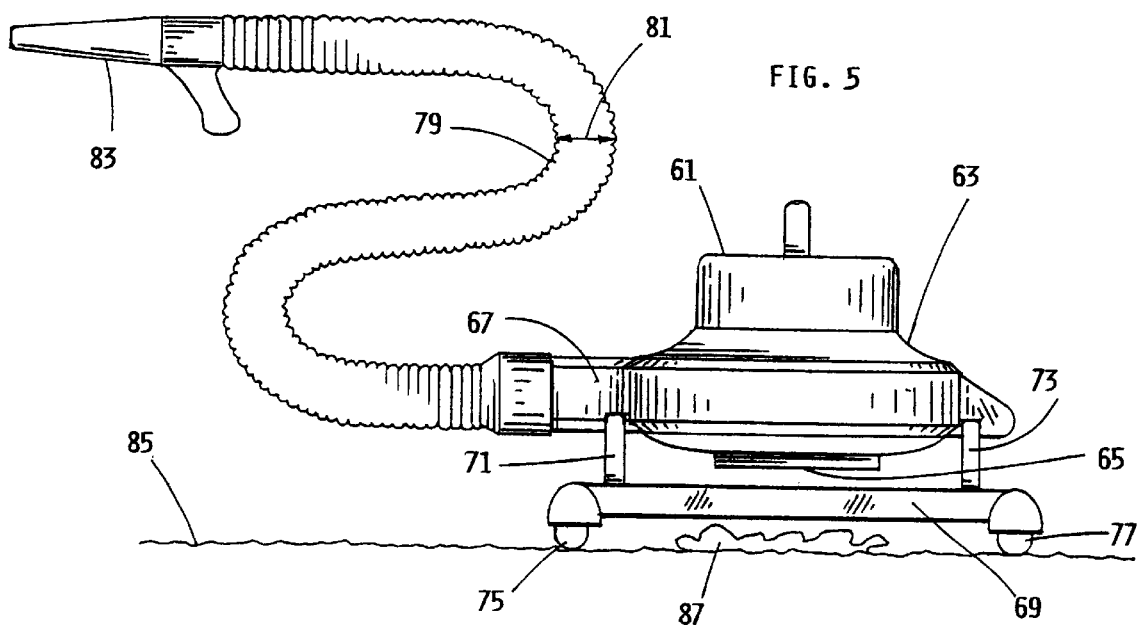
FIG. 5 shows a right side view of another present invention drying system comprising a centrifugal air blower, a base for the air blower, a hose and nozzle.

FIG. 5 illustrates a right side view of a present invention air blower drying system comprising a centrifugal air blower unit, a base for the air blower unit, a hose and nozzle. Air blower 61 has a housing 63 which is molded from plastic and has air inlet 65 and air outlet 67. The motor (not seen in this view) inside housing 63 of air blower unit 61 has a blade means attached (also not seen in this view) to produce an air flow through housing 63. Volumes of air at speed are drawn into inlet 65, move through and exit outlet 67. Air blower unit 61 is attached to brackets 71 and 73 which are attached to base 69. Base 69 is formed for use proximate or close to ground level 85 so that blower unit 61 is also operated proximate or close to ground level 85. Accordingly, base 69 is provided with means for mobility at or proximate ground level. The means for mobility shown in this embodiment is four small caster type wheels of which two are shown in this figure as 75 and 77. The present invention does not require a means for mobility, however, preferred embodiments of the present invention have a base with at least two small wheels. Base 69 is further formed so that air blower 61 is positioned thereon so that inlet 65 of blower unit housing 63 does not draw in debris represented by 87 found proximate ground level. Ground level 85 is defined herein as any substantially horizontal surface on which base 69 may rest during operation or use. Therefore, ground level 85 can represent almost any surface, indoors or outdoors, which can support base 69 of the present invention during operation or use. Debris 87 is defined herein as anything (except air) which could be found proximate or close to ground level which could be drawn into inlet 65 of air blower housing 63, including, but not limited to dirt, sand, gravel, stones leaves etc. Debris that is drawn in and passed through air blower unit 61 can often damage the automobile or whatever is being dried. Accordingly, base 69 is formed to position air blower 61 thereon such that the inlet 65 does not draw in debris proximate ground level to prevent air blower 61 from discharging debris onto whatever is being dried. In this embodiment shown here in FIG. 5, base 69 is merely formed solid to shield inlet 66 from debris 87 which is proximate ground level 85. Base 69 could be formed any number of ways to accomplish the same objective, for example, base 69 could provide means to attach blower unit 61 thereon with the inlet drawing air from the side or above. Air blower 61 also has a hose 79 attached to outlet 67 of housing 63. This hose has an inner diameter 81 which is equal to, or close to, the inner diameter of outlet 67 to maximize the performance of air blower 61. Accordingly, preferred embodiments of the present invention should have a hose having a sufficient inner diameter to substantially maintain the air flow performance produced by the motor (not shown in this view) and moved through blower unit housing 63. Hose 79 also has a nozzle 83 attached at one end thereof to assist a user in directing the air flow produced and discharged by air blower unit 61.

As specified earlier, it is an important objective of the present invention described herein to provide for an independent, relatively small, mobile drying system effective at removing a wetting agent from a washed and wetted vehicle, for example an automobile or motorcycle. And, another important objective of the present invention was that it be operable by a user over extended periods without fatigue, and/or hearing discomfort. The present invention is the result of the combined objectives, wherein an air blower is attached to a base formed for use proximate ground level. The user does not need to handle and manipulate the heavy blower unit, only the connected hose and nozzle which are lightweight and easy to handle over extended periods. In addition, the user's ears are somewhat isolated from the noisy blower unit which rests on the ground, a short, none the less, remote distance away from the user.

Figure 6:
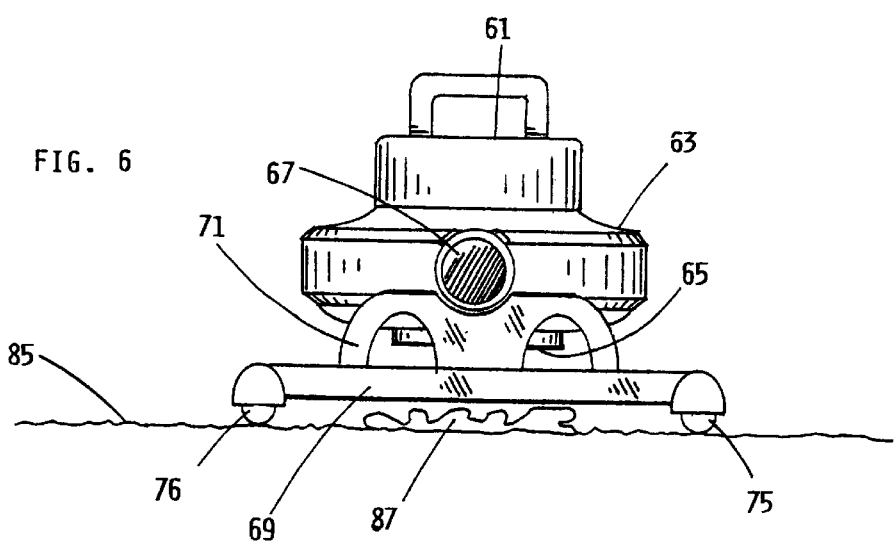
FIG. 6 shows a front view of the air blower shown in FIG. 5.

FIG. 6 shows a front view of the air blower shown in FIG. 5. Again, air blower 61 has a housing 63 which is molded from plastic and has air inlet 65 and air outlet 67. The motor (not seen in this view) inside housing 63 of air blower unit 61 has a blade means attached (also not seen in this view) to produce an air flow through housing 63. Volumes of air at speed are drawn into inlet 65, and exit outlet 67. Air blower unit 61 is attached to brackets 71 and 73 (bracket 73 is not shown in this front view) which are attached to base 69. Base 69 is formed for use proximate or close to ground level 85 so that blower unit 61 is also operated proximate or close to ground level. Accordingly, base 69 is provided with means for mobility at or proximate ground level. The means for mobility shown in this embodiment is four small caster type wheels of which two are shown in this figure as 75 and 76. The present invention does not require a means for mobility, however, preferred embodiments of the present invention have a base with at least two small wheels. Base 69 is further formed so that air blower 61 is positioned thereon so that inlet 65 of blower housing 63 does not draw in debris represented by 87 found proximate ground level.

Upon reading and understanding the specification of the present invention described above, modifications and alterations will become apparent to those skilled in the art. It is intended that all such modifications and alterations be included insofar as they come within the scope of the patent as claimed or the equivalence thereof.

What is claimed:

1. A drying system for removing a wetting agent from surfaces of a vehicle, said drying system comprising:
    an application of a surfactant to the surfaces of the vehicle, said surfactant providing a reduction in the coefficient of friction between the surfaces of said vehicle and said wetting agent; and,
    an air blower device for blowing off and removal of said wetting agent from the surfaces of said vehicle, said air blower comprising a housing formed for use proximate ground level with an inlet and an outlet, and a motor therein having a shaft with blade means attached thereto for producing an air flow, said housing further being formed whereas said air blower does not draw in debris proximate said ground level, and, a hose being substantially flexible and having a sufficient inner diameter to substantially maintain said produced airflow being attached to and extending from said air blower device.

2. A drying system of claim 1, wherein the produced air flow of said air blower is substantially perpendicular to said motor shaft.

3. A drying system of claim 1, wherein the surfactant is combined with a wetting agent used for washing said vehicle.

4. A drying system of claim 1, wherein the surfactant is combined with a wetting agent used for rinsing said vehicle.

5. A drying system of claim 1, wherein the surfactant is applied to the surfaces of said vehicle prior to said vehicle being wetted.

6. A drying system of claim 2, wherein the surfactant is combined with a wetting agent used for washing said vehicle.

7. A drying system of claim 2, wherein the surfactant is combined with a wetting agent used for rinsing said vehicle.

8. A drying system of claim 2, wherein the surfactant is applied to the surfaces of said vehicle prior to said vehicle being wetted.

9. A drying system for removing a wetting agent from surfaces of a vehicle, said drying system comprising:

an application of a surfactant to the surfaces of the vehicle, said surfactant providing a reduction in the coefficient of friction between the surfaces of said vehicle and said wetting agent; and, an air blower device for blowing off and removal of said wetting agent from the surfaces of said vehicle, said air blower being provided means for mobility and comprising a housing formed for use proximate ground level with an inlet and an outlet, and a motor therein having a shaft with blade means attached thereto for producing an air flow substantially perpendicular to said motor shaft, said housing further being formed whereas said air blower does not draw in debris proximate said ground level, and, a hose being substantially flexible and having a sufficient inner diameter to substantially maintain said produced airflow being attached to and extending from said air blower device.

10. A drying system of claim 9, wherein the surfactant is combined with a wetting agent used for washing said vehicle.

11. A drying system of claim 9, wherein the surfactant is combined with a wetting agent used for rinsing said vehicle.

12. A drying system of claim 9, wherein the surfactant is applied to the surfaces of said vehicle prior to said vehicle being wetted.

13. A wetting and drying system for application of a wetting agent and removal of a wetting agent from surfaces of a vehicle, said wetting and drying system comprising:

an application of a surfactant to the surfaces of the vehicle, said surfactant providing a reduction in the coefficient of friction between the surfaces of said vehicle and said wetting agent: and, an independent, motorized washing and drying apparatus comprising a base being formed for the attachment of both a motorized washing device and a motorized drying device, said base having means for mobility being at least two wheels, said motorized washing device being attached to said base and having a motor capable of pressurizing and discharging washing fluids through a hose being substantially flexible and long thereby requiring handling by a user to direct the discharge of said washing fluids; said motorized drying device being attached to said base and having a housing formed with an inlet and an outlet, and a motor therein having a shaft with blade means attached thereto for producing an air flow through a hose being substantially flexible and long thereby requiring handling by a user to direct said produced airflow onto the surfaces of said vehicle for the removal of said wetting agent.

14. The wetting and drying system of claim 13, wherein the motor of said washing device is an electric type, and the motor of said drying device is an electric type.

15. The wetting and drying system of claim 13, wherein the motor of said washing device is an internal combustion type and the motor of said drying device is an internal combustion type.

16. The wetting and drying system of claim 13, wherein the surfactant is combined with a wetting agent used for washing said vehicle.

17. The wetting and drying system of claim 13, wherein the surfactant is combined with a wetting agent used for rinsing said vehicle.

18. The wetting and drying system of claim 13, wherein the surfactant is applied to the surfaces of said vehicle prior to said vehicle being wetted.

19. The wetting and drying system of claim 14, wherein the surfactant is combined with a wetting agent used for washing said vehicle.

20. The wetting and drying system of claim 14, wherein the surfactant is combined with a wetting agent used for rinsing said vehicle.

21. The wetting and drying system of claim 14, wherein the surfactant is applied to the surfaces of said vehicle prior to said vehicle being wetted.

22. The wetting and drying system of claim 15, wherein the surfactant is combined with a wetting agent used for washing said vehicle.

23. The wetting and drying system of claim 15, wherein the surfactant is combined with a wetting agent used for rinsing said vehicle.

24. The wetting and drying system of claim 15, wherein the surfactant is applied to the surfaces of said vehicle prior to said vehicle being wetted.

* * * * *